United States Patent
Cai et al.

(10) Patent No.: US 10,620,883 B1
(45) Date of Patent: Apr. 14, 2020

(54) MULTI-FORMAT MIGRATION FOR NETWORK ATTACHED STORAGE DEVICES AND VIRTUAL MACHINES

(71) Applicant: Cohesity, Inc., San Jose, CA (US)

(72) Inventors: Zheng Cai, Cupertino, CA (US); Rupesh Bajaj, Dewas (IN); Chinmaya Manjunath, San Jose, CA (US); Anand Arun, San Jose, CA (US); Markose Thomas, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 16/257,689

(22) Filed: Jan. 25, 2019

Related U.S. Application Data

(60) Provisional application No. 62/788,335, filed on Jan. 4, 2019.

(51) Int. Cl.
*G06F 3/06* (2006.01)
*G06F 9/455* (2018.01)

(52) U.S. Cl.
CPC ............ *G06F 3/067* (2013.01); *G06F 3/0617* (2013.01); *G06F 3/0647* (2013.01); *G06F 9/45558* (2013.01); *G06F 2009/4557* (2013.01); *G06F 2009/45595* (2013.01)

(58) Field of Classification Search
CPC .................................................... G06F 3/067
See application file for complete search history.

(56) References Cited

U.S. PATENT DOCUMENTS

| | | | |
|---|---|---|---|
| 8,959,055 B1* | 2/2015 | Koryakina | G06F 11/1458 707/649 |
| 2006/0005189 A1* | 1/2006 | Vega | G06F 9/4856 718/1 |
| 2017/0024286 A1* | 1/2017 | Vijayan | G06F 16/113 |
| 2019/0227727 A1* | 7/2019 | Wang | G06F 11/14 |

* cited by examiner

*Primary Examiner* — Van H Oberly
(74) *Attorney, Agent, or Firm* — Van Pelt, Yi & James LLP

(57) ABSTRACT

A method and system for migrating data are described. A storage capture instance in a first format from a first type of device is received. Processing utilized to back up the storage capture instance to a second format of a snapshot tree is distributed to multiple storage nodes. A request to migrate at least part of the storage capture instance to a second type of device in a third format is received. In response to the request, processing utilized to migrate the at least part of the storage capture instance from the second format to the second type of device in the third format is distributed to the storage nodes. In one aspect, file(s) in a first network attached storage (NAS) device format are migrated to a second NAS device format. In another aspect, a virtual machine (VM) and/or file(s) therein having a first VM format are migrated to a second VM format.

24 Claims, 13 Drawing Sheets

MULTI-FORMAT MIGRATION FOR NETWORK ATTACHED STORAGE DEVICES AND VIRTUAL MACHINES

CROSS REFERENCE TO OTHER APPLICATIONS

This application claims priority to U.S. Provisional Patent Application No. 62/788,335 entitled MULTI-FORMAT RESTORATION FOR NETWORK ATTACHED STORAGE DEVICES AND VIRTUAL MACHINES filed Jan. 4, 2019 which is incorporated herein by reference for all purposes.

BACKGROUND OF THE INVENTION

Often, file system data is desired to be replicated and migrated to another format. For example, a primary storage system may store data for enterprise applications. A secondary storage may be used to provide backup, protection or other services for the primary storage system. Thus, data on the primary storage system may be replicated on the secondary storage system. Such a secondary storage system may store large amounts of data (e.g., terabytes, petabytes, etc.) desired to be available for long periods of time.

Over time, other storage and database systems become available or better suited to the needs of the enterprise. In order to use new systems, files, virtual machines, and/or other data are desired to be migrated from existing systems to the new systems. Typically, this migration is time consuming, requires manual intervention by administrators, and can be prone to error. Similarly, the ability to utilize different platforms is also desired. Accordingly, what would be useful is a mechanism for facilitating migration of data between systems.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method and system for migrating data are described. A storage capture instance in a first format from a first type of device is received. Backup processing utilized to back up the storage capture instance to a second format of a snapshot tree is distributed to multiple storage nodes. A request to migrate at least a portion of the storage capture instance to a second type of device in a third format is received. In response to the request, migrate processing utilized to migrate at least the portion of the storage capture instance from the second format to the second type of device in the third format is distributed to the storage nodes. In one aspect, file(s) in a first network attached storage (NAS) device format are migrated to a second NAS device format. In another aspect, a virtual machine (VM) and/or file(s) therein having a first VM format are migrated to a second VM format.

Figure 1:
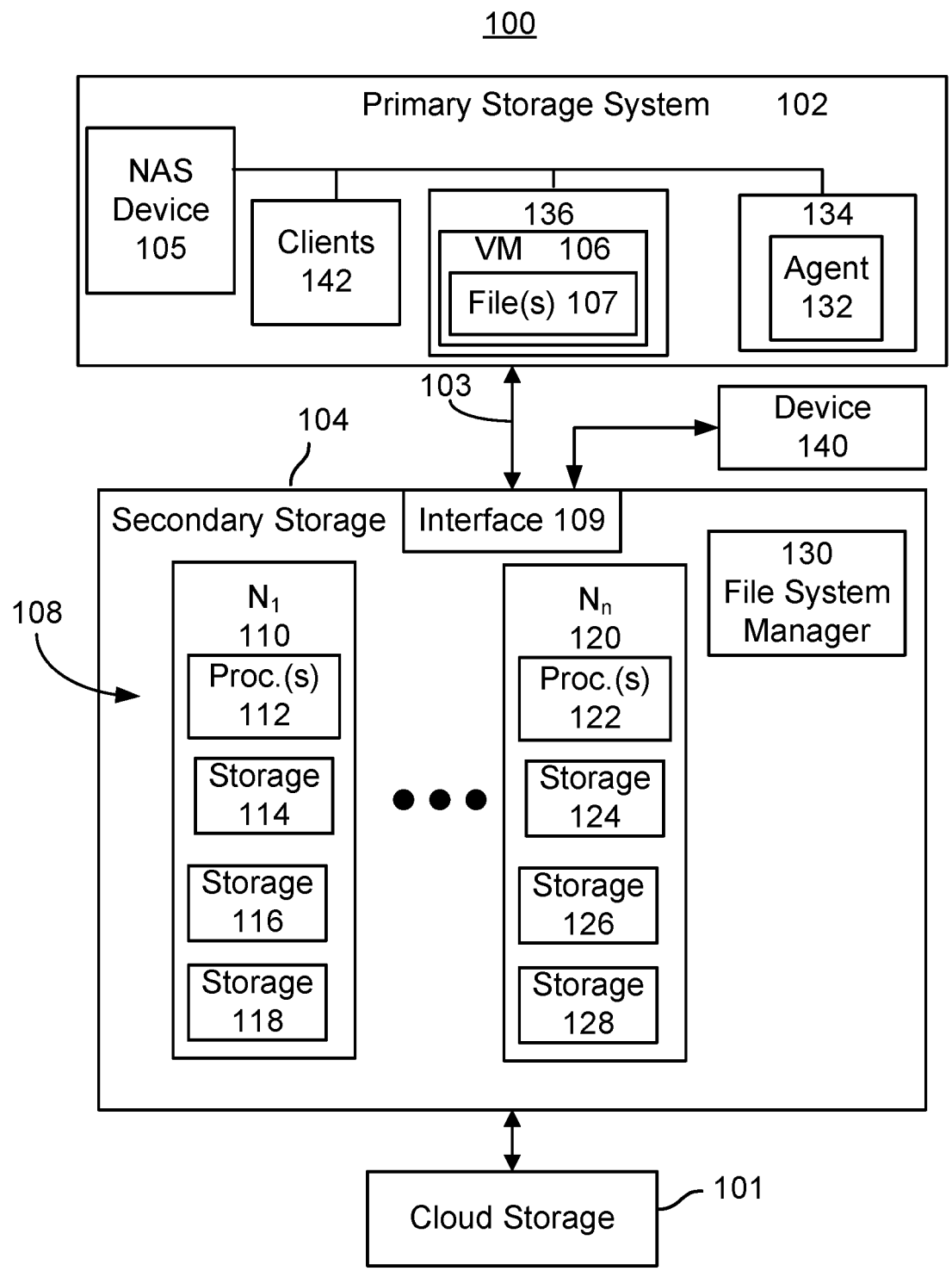
FIG. 1 is a block diagram illustrating an embodiment of a distributed storage system capable of performing multi-format migrations.

FIG. 1 is a block diagram of system 100 for managing a distributed storage system capable of a multi-format migration. System 100 includes a primary storage system 102, secondary storage system 104 and cloud storage 101. Primary storage system 102 is a computing system that stores file system data. Primary storage system 102 may be comprised of one or more servers, one or more computing devices, one or more storage devices, and/or a combination thereof. Such devices are depicted generally as clients 142. Primary storage system 102 also includes network attached storage (NAS) device 105. NAS device 105 might include a NetApp device, an Isilon device or analogous device. Each type of NAS device 105 has its own application program interface (API) and behaviors, even if the NAS device shares protocols with another type of NAS devices. For example, a NetApp device may have a corresponding NetApp format different from an Isilon format for an Isilon device even if both use server message block (SMB) protocols for communication. For clarity, only one NAS device 105 is shown. However, multiple NAS devices of the same or differing types may be present. NAS device 105 may be a legacy storage system currently or previously used by primary storage system 102. Although shown as part of primary storage system 102, in another embodiment, NAS device 105 could be a separate device used in conjunction with and connected to primary storage system 102.

Also shown as part of primary storage system is virtual machine (VM) 106 including one or more files 107 and backup agent 132. Although only one VM 106 is shown, multiple VMs may be present in primary storage system 102. A VM is a software implementation of a machine (e.g., a computer) that simulates the way a physical machine executes programs. A hypervisor may manage the VMs. A hypervisor can comprise hardware, software, firmware or combinations thereof. In some examples, the hypervisor may be part of an operating system or interoperate with an operating system. In some examples, the hypervisor interfaces between the physical hardware and the VMs, providing a layer of abstraction to the VMs. Examples of hypervisors include the VMware Workstation® and Oracle VM VirtualBox®. VM 106 and backup agent 132 are shown as hosted by devices 136 and 134, respectively. Devices 136 and 134 may be computing devices, servers, storage systems or other computing components of primary storage system 102.

Primary storage system 102 may be configured to backup file system data to secondary storage system 104 according to one or more backup policies. Backup agent 132 (e.g. Cohesity agent) orchestrates a backup of primary system 102. In some embodiments, backup agent 132 may initiate a backup according to one or more backup policies. In some embodiments, a backup policy indicates that file system data for primary storage system 102 are to be backed up to cloud 101 and/or secondary storage system 104 on a periodic basis (e.g., hourly, daily, weekly, monthly, etc.). In other embodiments, a backup policy indicates that file system data is to be backed up cloud 101 and/or secondary storage system 104 when a threshold size of data has changed. In other embodiments, a backup policy indicates that file system data is to be backed up cloud 101 and/or secondary storage system 104 upon a command from a user associated with primary storage system 102. In addition to controlling backup of primary storage system 102, backup agent 132 may manage back up of NAS device 105. Backup policies may dictate that NAS device 105 is backed up to cloud 101 and/or secondary storage system 104 using the same or different criteria as for primary storage system 102.

Secondary storage system 104 is a storage system configured to backup file system data received from primary storage system 102 and NAS device 105. Secondary storage system 104 may thus be coupled with the primary storage system 102 through a network 103 and network interface 109. Secondary storage system 104 may protect a large volume of applications while supporting tight business requirements (recovery time objective (RTO) and recovery point objective (RPO)). Secondary storage system 104 may unify end-to-end protection infrastructure—including target storage, provide backup, replication of data, disaster recover, and/or cloud tiering. Secondary storage system 104 may provide scale-out, globally deduplicated, highly available storage to consolidate all secondary data, including backups, files, and test/dev copies. Secondary storage system simplifies backup infrastructure and eliminates the need to run separate backup software, proxies, media servers, and archival. Secondary storage system 104 may be fully integrated with a VM centralized management tool, such as vCenter, and an API for data protection. Secondary storage system may reduce the amount of time to perform a RPOs and support tightly constrained RTOs by creating a clone of a backup VM and running the VM directly from secondary storage system 104. Secondary storage system 104 may integrate natively with one or more cloud servers. This eliminates the need to use tape archives by using one or more cloud servers for long-term data archival. However, nothing prevents the use of tape archives in conjunction with secondary storage system 104 if desired.

Secondary storage system 104 may be configured to implement policy based archival of older snapshots on cluster 108 to cloud storage for long-term retention. The cloud archive allows data to be indexed for fast search and retrieval back to cluster 108 from the cloud. The cloud archive allows recovery of data to a different site or other hardware in the event the primary cluster fails. The cloud archive may allow data encryption in-flight and at-rest in the cloud. Secondary storage system 104 may be configured to archive a copy of the file system data in a remote storage for disaster recovery. Secondary storage system 104 may be configured to move certain file system data to a remote storage location, such as cloud storage 101, to handle spikes in storage demand. Secondary storage system 104 may be configured to implement a policy-based waterfall model that moves cold data to a remote storage location, such as cloud storage 101. Responsive to receiving a read for data that is stored at the remote storage location, secondary storage system 104 can be configured to retrieve the data and store the data at the secondary storage location.

Secondary storage system 104 is configured to store the file system data in a tree data structure and to create a snapshot of the tree data structure. The snapshot may be associated with a view at a particular moment in time. A view depicts the connections between nodes and the data stored in one or more leaf nodes at the particular moment in time. The tree data structure allows a chain of snapshot trees (e.g. a Cohesity snaptree) to be linked together. Each time a snapshot is performed, a root node of the snapshot tree may be linked to one or more intermediate nodes associated with a previous snapshot tree. Secondary storage system 104 may archive the file system data to cloud storage system 101 or to the cluster 108 of secondary storage system 104. The archive may include the file system data and a serialized snapshot tree data that is a serialized version of the tree data structure at the particular moment in time. In some embodiments, the archive includes a full snapshot archive of the file system data. In some embodiments, the archive includes an incremental snapshot archive of the file system data. In some embodiments, a backup policy may indicate that one or more previous snapshots are to be deleted after a full snapshot is performed.

Secondary storage system 104 may be configured to archive data stored on secondary storage system 104 (e.g., tree data, other non-tree data) according to one or more archive policies. In some embodiments, an archive policy indicates that the data is to be archived to a cloud storage system and/or to a cluster storage system on a periodic basis (e.g., hourly, daily, weekly, monthly, etc.). In other embodiments, an archive policy indicates that data is to be archived to a cloud storage system and/or to a cluster storage system when a threshold size of data has changed. In other embodiments, an archive policy indicates that data is to be archived to a cloud storage system and/or to an additional cluster storage system upon a command from a user associated with secondary storage system 104.

Secondary storage system 104 may include a file system manager 130, which is configured to maintain file system data in the form of nodes arranged in the tree data structure. File system manager 130 may include instructions stored in memory (not explicitly shown in FIG. 1) and run by a processor (not shown in FIG. 1). In some embodiments, leaf nodes in the file system tree include key-value pairs that associate data keys with values in the form of particular items of file system data. A user requests a particular item of data by providing a data key to file system manager 130, which traverses a file system tree to find the item of data associated with that data key. File system manager 130 may be configured to perform a snapshot of a snapshot tree. File system manager 130 may be configured to perform one or more modifications to a snapshot tree.

Storage cluster 108 of secondary storage system 100 includes a plurality of storage nodes $N_1$ through $N_n$. For simplicity, only storage nodes $N_1$ 110 and $N_n$ 120 are labeled and shown. Each storage node 110 through 120 of secondary storage system 104 may be comprised of one or more processors 112 and 122 and accompanying storage elements 114, 116 and 118 and 124, 126 and 128, respectively. Storage elements 114, 116, 118, 124, 126 and/or 128 may be solid state drives, one or more hard disk drives, or a combination thereof. Secondary storage system 104 may also include one or more processors coupled to the storage drives and configured to archive data stored in the storage drives to cloud storage system 101, an additional cluster (not shown), and/or one or more other storage mediums (e.g. tape, removable storage).

Cloud storage system 101 may be a public cloud storage provider (e.g., Amazon Web Services, Microsoft Azure Blob Storage, Google Cloud Storage). Cloud storage system 101 is configured to receive and store an archive from secondary storage system 104. Cloud storage system 101 may store a full snapshot of file system data and associated serialized snapshot tree data. Cloud storage system 101 may store an incremental snapshot of file system data and associated serialized snapshot tree data. Cloud storage system 101 may provide to secondary storage system 104 file system data and a serialized snapshot tree data associated with a particular time.

Figure 2A:
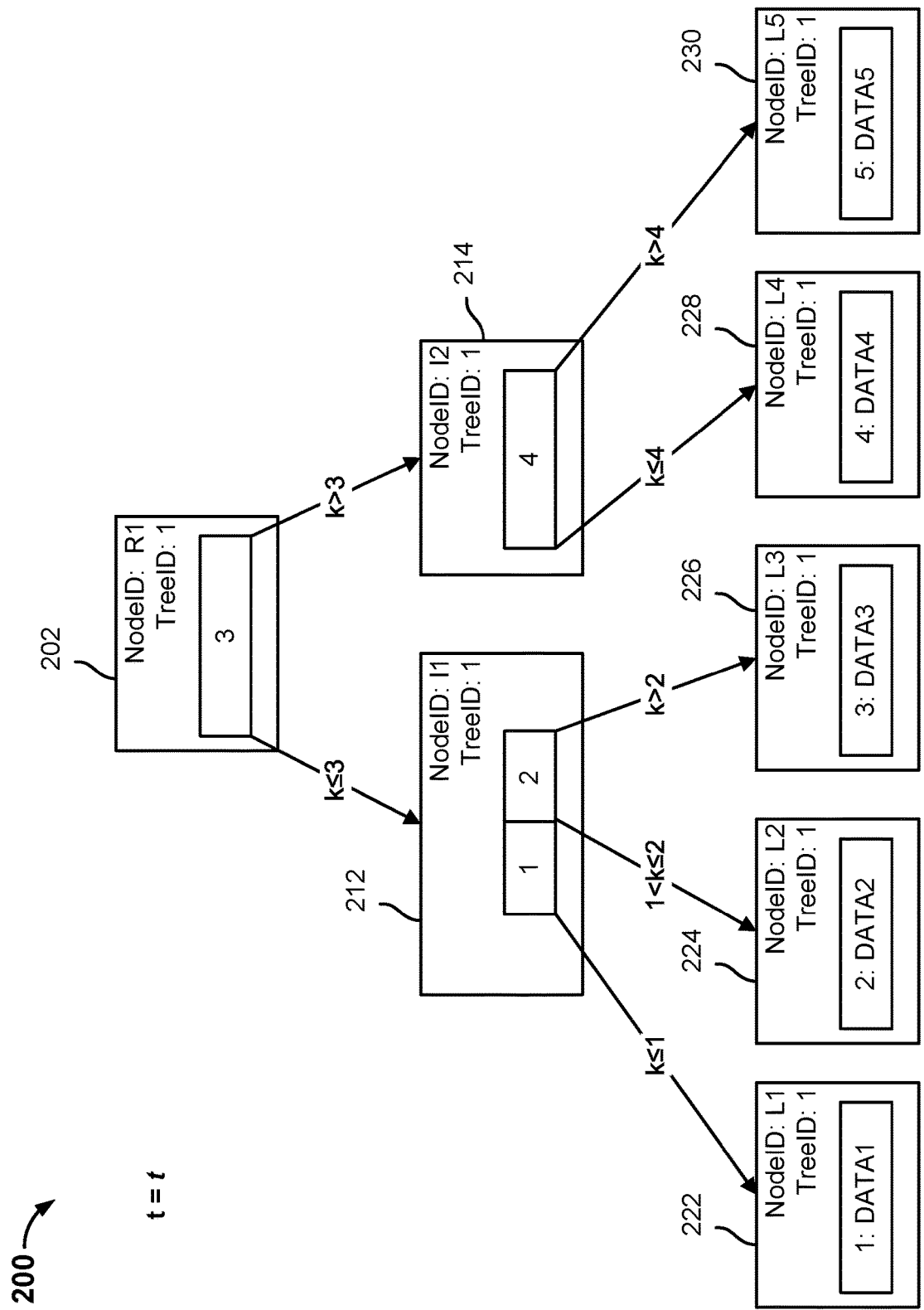
FIG. 2A is a block diagram illustrating an embodiment of a snapshot tree storing file system data.

For example FIGS. 2A-2E and 3A-3D describe snapshot trees. FIG. 2A is a block diagram illustrating an embodiment of a tree data structure storing file system data. In the example shown, tree data structure 200 may be created by a storage system, such as secondary storage system 104. In the example shown, tree data structure 200 is a snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, and 230, there could be any number of intermediate levels in a snapshot tree. Tree data structure 200 may be a snapshot tree of file system data at a particular point in time t. Tree data structure 200 may correspond to a version of a snapshot tree. Root node 202 is associated with the snapshot of the file system data at the particular point in time t. In some embodiments, the file system data is metadata for a distributed file system and may include information, such as file size, directory structure, file permissions, physical storage locations of the files, etc.

A root node is the root of a snapshot tree and may include pointers to one or more other nodes. Each pointer includes a range of numerical and sorted data keys that can be found by following that particular pointer. An intermediate node is a node to which another node points (e.g., root node, other intermediate node) and includes one or more pointers to one or more other nodes. A leaf node is a node at the bottom of a snapshot tree. In some embodiments, a leaf node is a node to which another node points, but does not include a pointer to any other node. In other embodiments, a leaf node is a node to which another node points and includes a pointer to the root node of another snapshot tree. A leaf node may store key-value pairs of file system data. A data key k is a lookup value by which a particular leaf node may be accessed. For example, "1" is a data key that may be used to lookup "DATA1" of leaf node 222. Examples of values stored by a leaf node include, but are not limited to, file size, directory structure, file permissions, physical storage locations of the files, etc. A leaf node may store a data key k and a pointer to a location that stores the value associated with the data key.

A root node or an intermediate node may include one or more node keys. The node key may be an integer value or a non-integer value. Each node key indicates a division between the branches of the node and indicates how to traverse the tree data structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2," and "3" are less than or equal to the node key "3." To find a leaf node storing a value associated with a data key of "4" or "5," the second branch of root node 202 would be traversed to intermediate node 214 because data keys "4" and "5" are greater than the node key of "3."

A data key k of a key-value pair is not limited to a numerical value. In some embodiments, non-numerical data keys may be used for a data key-value pair (e.g., "name," "age," etc.) and a numerical number may be associated with the non-numerical data key. For example, a data key of "name" may correspond to a numerical key of "4." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function applied to a data key to provide a hash. The hash may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the snapshot/view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing snapshot tree 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1," "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes a pointer to leaf node 228 and a pointer to leaf node 230. Intermediate node 214 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "4." The pointer to leaf node 230 indicates that traversing tree data structure 200 from intermediate node 214 to leaf node 230 will lead the node with a data key of "5."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222.

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224.

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226.

Leaf node 228 includes a data key-value pair of "4: DATA4." Leaf node 228 includes NodeID of "L4" and a TreeID of "1." To view the value associated with a data key of "4," tree data structure 200 is traversed from root node 202 to intermediate node 214 to leaf node 228.

Leaf node 230 includes a data key-value pair of "5: DATA5." Leaf node 230 includes NodeID of "L5" and a TreeID of "1." To view the value associated with a data key of "5," tree data structure 200 is traversed from root node 202 to intermediate node 214 to leaf node 230.

Figure 2B:
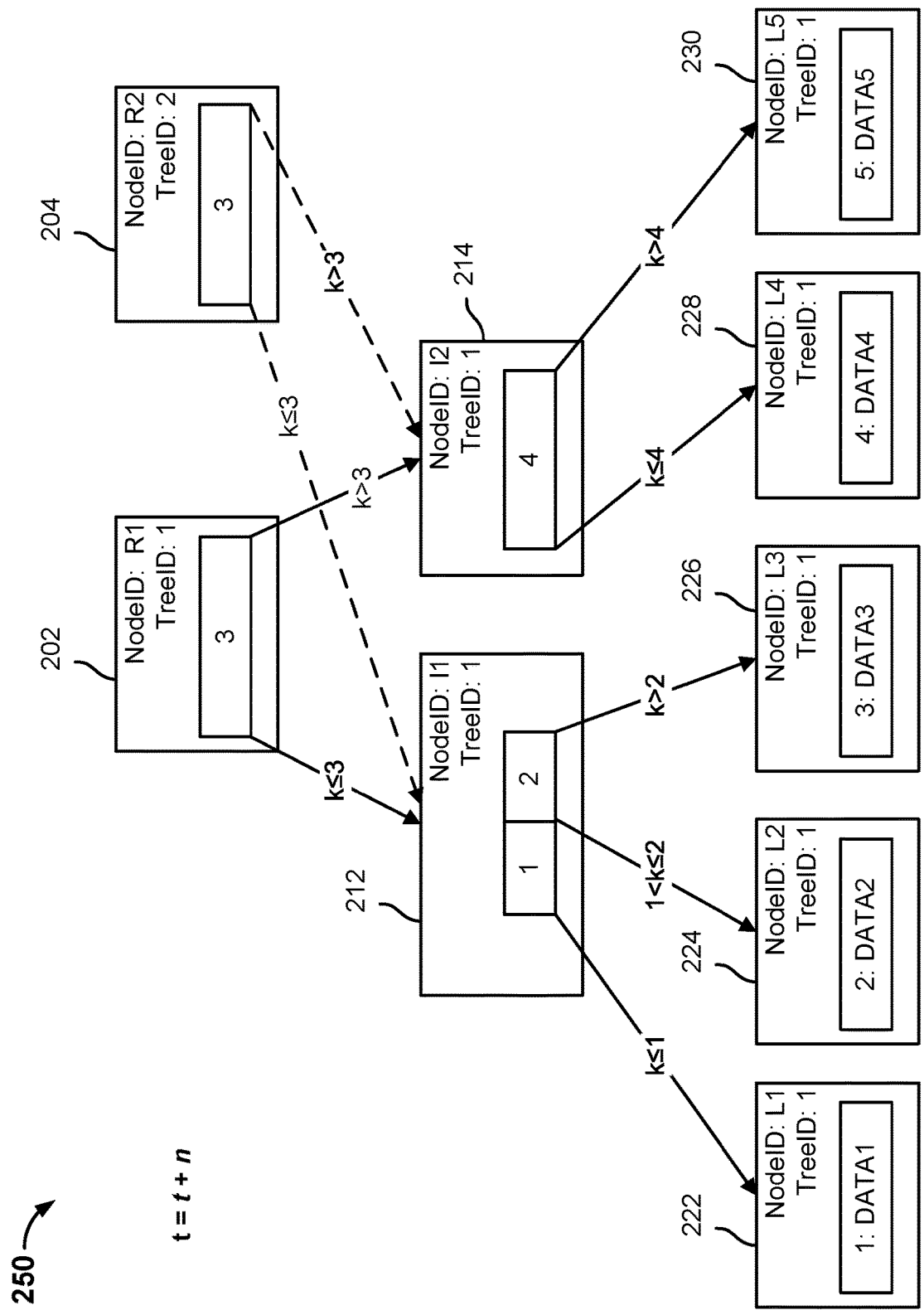
FIG. 2B is a block diagram illustrating an embodiment of cloning a snapshot tree.

FIG. 2B is a block diagram illustrating an embodiment of cloning a snapshot tree of a tree data structure. In some embodiments, tree data structure 250 may be created by a storage system, such as secondary storage system 104. In the example shown, snapshot tree 250 includes a snapshot tree that is comprised of root node 204, intermediate nodes 212, 214, and leaf nodes 222, 224, 226, 228, and 230. Tree data structure 250 may be a snapshot of file system data at a particular point in time t+n. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at time t+n is linked to the snapshot tree at time t. To create a snapshot tree of the file system data at time t+n, a copy of the previous root node is created. The root node copy includes the same set of pointers as the original node. However, the root node copy also includes a different NodeID and a different TreeID than the original. The TreeID is the identifier associated with a view. Root node 204 is associated with the snapshot of the file system data at the particular point in time t+n. Root node 202 is associated with the snapshot of the file system data at the particular point in time t. The snapshot tree at time t+n may correspond to a version of a snapshot tree. In some embodiments, the snapshot tree at time t+n is a current view of the file system metadata. A current view may still accept one or more changes to the data. The TreeID of a root node indicates a snapshot with which the root node is associated. For example, root node 202 with a TreeID of "1" is associated with a first snapshot and root node 204 with a TreeID of "2" is associated with a second snapshot. In other embodiments, the snapshot tree at time t+n is a snapshot view of the file system metadata. A snapshot view may not accept any changes to the data.

In some embodiments, to create a snapshot of the file system at time t+n, two root node copies are created. Providing two new root nodes, each with a different TreeID prevents updates made to a particular view (e.g., current view) from affecting nodes of a different view (e.g., snapshot view). One of the new root nodes may be associated with a current view (i.e., modifiable) and the other new root node may be associated with a snapshot view (i.e., not modifiable). In some embodiments, a root node associated with a previous snapshot is deleted after a snapshot is performed, i.e., root node 202 is deleted after root node 204 is created.

In the example shown, root node 204 is a copy of root node 202. Similar to root node 202, root node 204 includes the same pointers as root node 202, except that root node 204 includes a different node identifier and a different view identifier. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "4" or "5." Root node 204 includes a NodeID of "R2" and a TreeID of "2." The NodeID identifies the name of the node. The TreeID identifies the snapshot with which the node is associated.

Figure 2C:
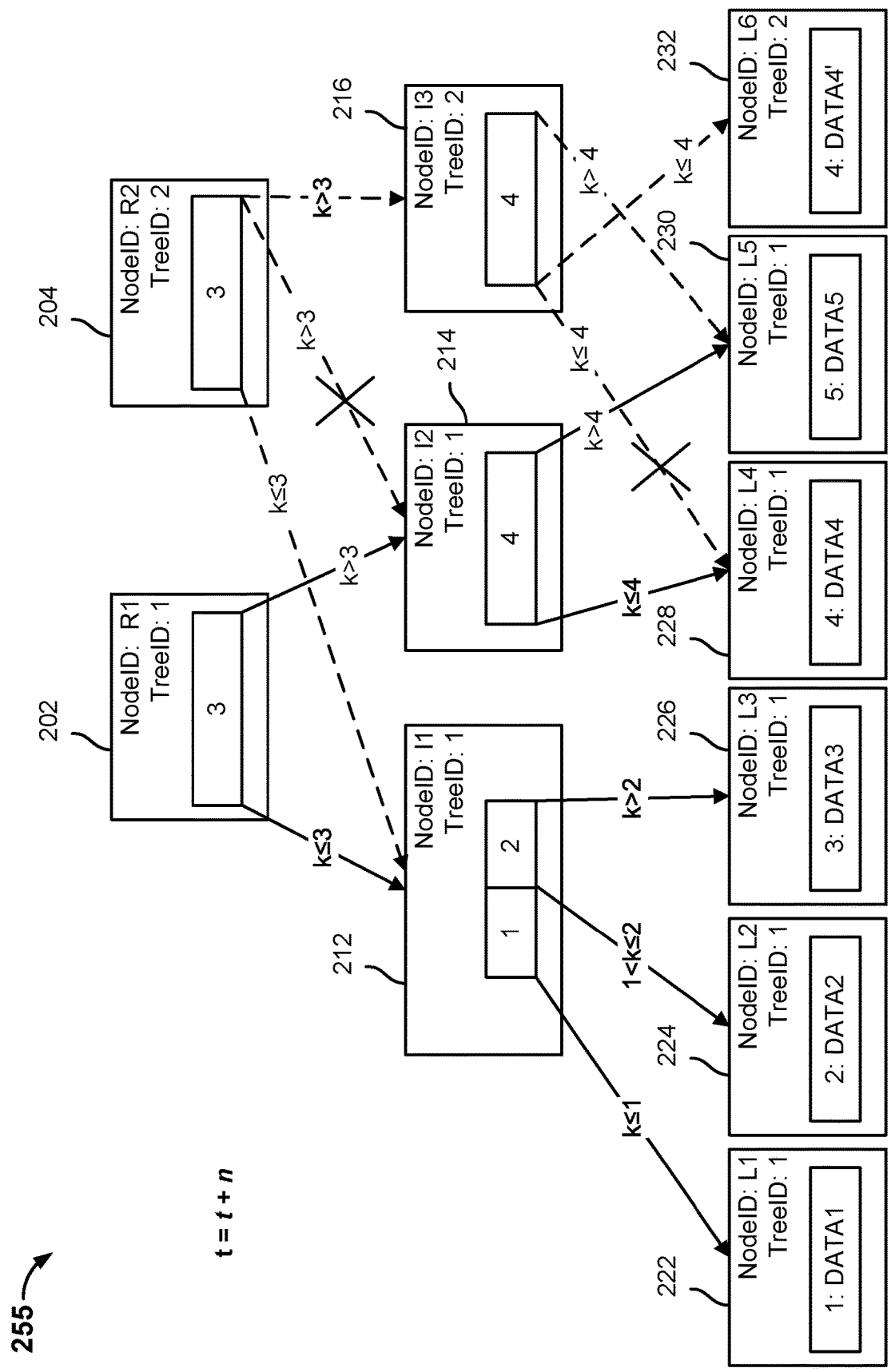
FIG. 2C is a block diagram illustrating an embodiment of modifying a snapshot tree.

FIG. 2C is a block diagram illustrating an embodiment of modifying a snapshot tree. In the example shown, tree data structure 255 may be modified by a file system manager, such as file system manager 105. Tree data structure 255 may be a current view of the file system data at time t+n. A current view may still accept one or more changes to the data. Because a snapshot represents a perspective of the file system metadata that is "frozen" in time, one or more copies of one or more nodes affected by a change to file system metadata are made. Tree data structure 255 may include a root node that corresponds to a version of a snapshot tree.

In the example shown, the value "DATA4" has been modified to be "DATA4'." At time t+n, the file system manager starts at root node 204 because that is the root node associated with snapshot tree at time t+n. The value "DATA4" is associated with the data key "4." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 204 and proceeds to intermediate node 214. The file system manager compares the TreeID of intermediate node 214 with the TreeID of root node 204 (the identifier associated with a snapshot at time t=t+n), determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a set of pointers of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

Figure 2D:
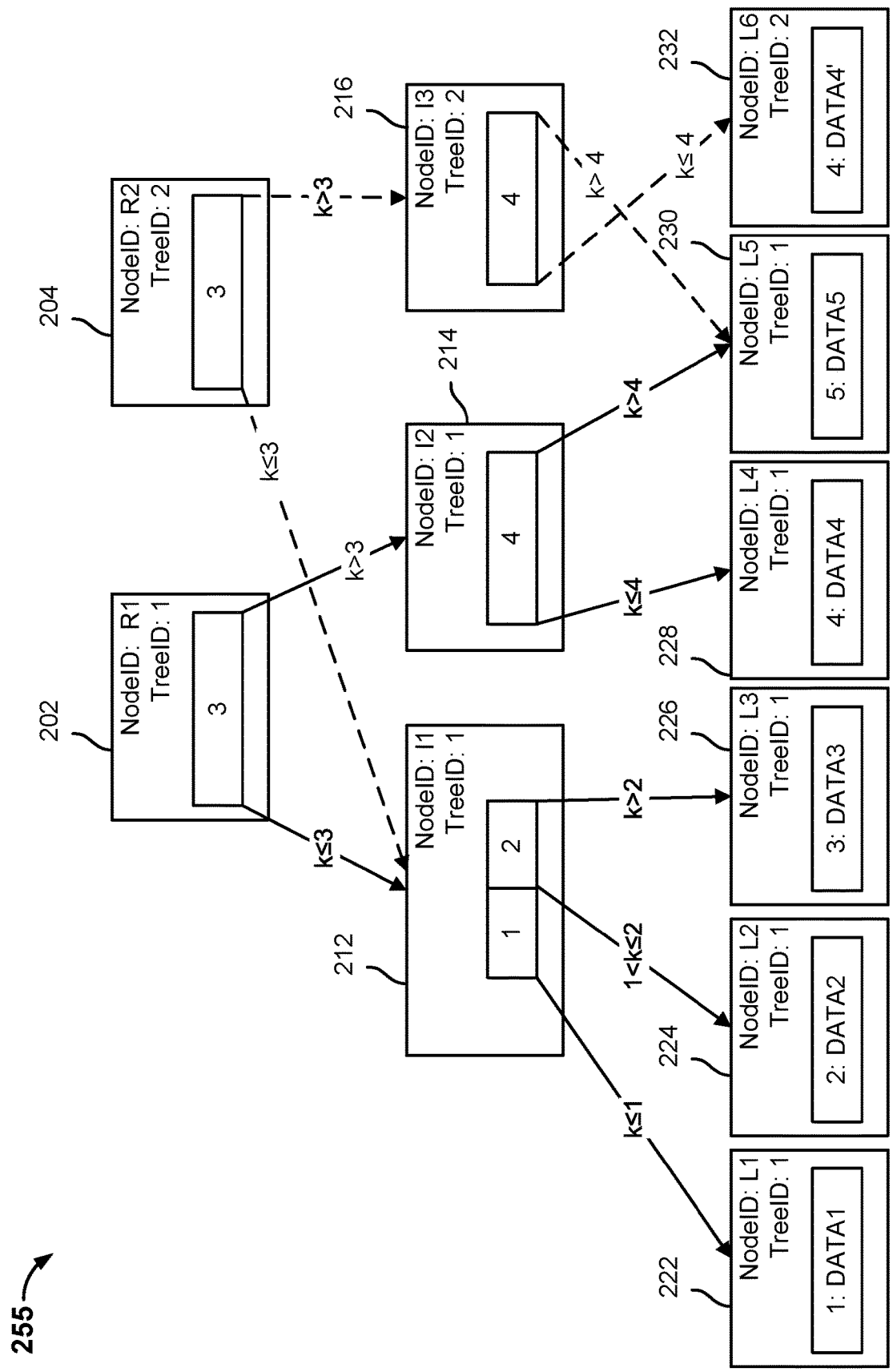
FIG. 2D is a block diagram illustrating an embodiment of a modified snapshot tree.

FIG. 2D is a block diagram illustrating an embodiment of a modified snapshot tree of a tree data structure. The tree data structure 255 shown in FIG. 2D illustrates a result of the modifications made to tree data structure 255 as described with respect to FIG. 2C.

Figure 2E:
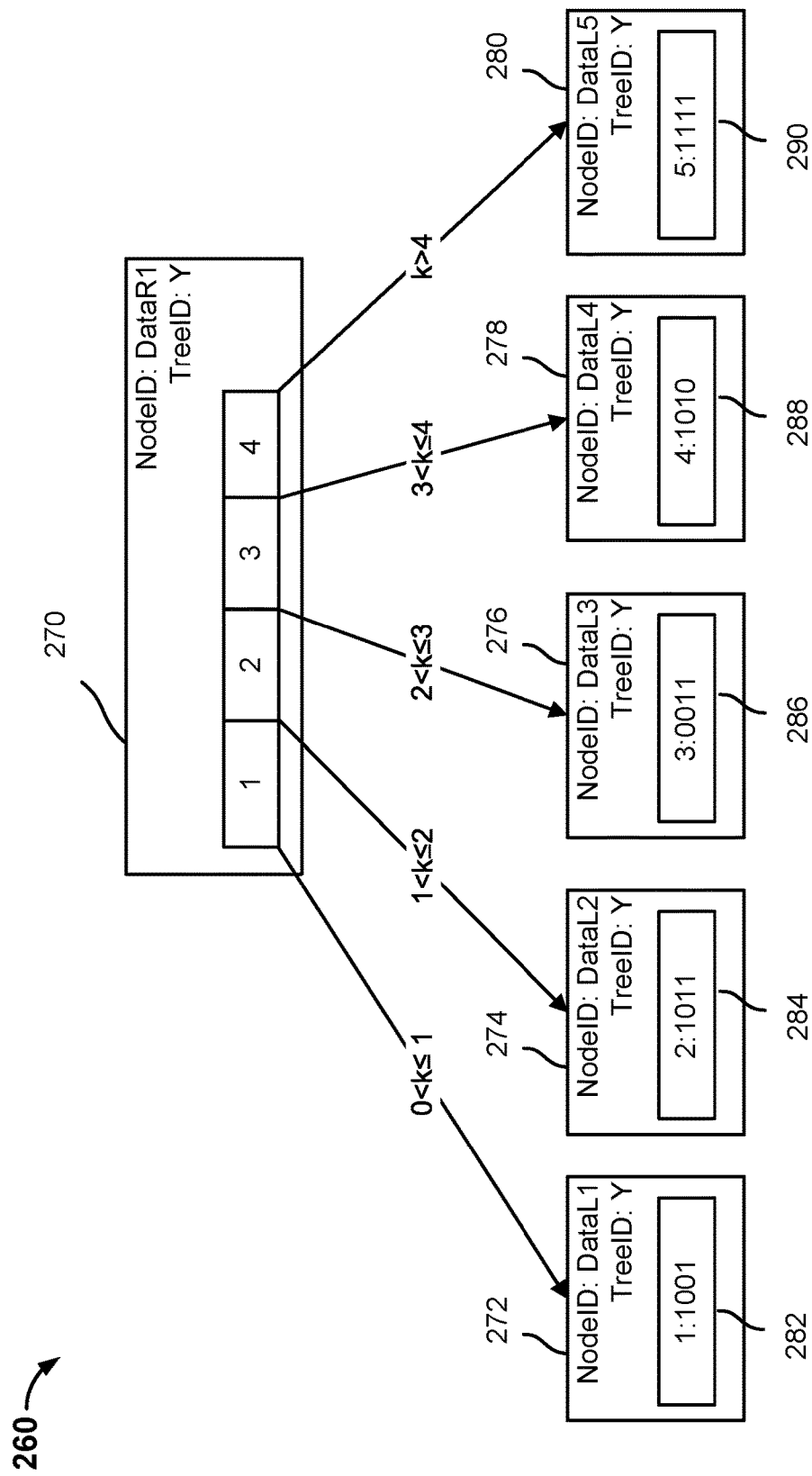
FIG. 2E is a block diagram illustrating an embodiment of leaf node data.

FIG. 2E is a block diagram illustrating an embodiment of leaf node data. In the example shown, leaf node 260 may be leaf node 222, 224, 226, 228, 230. A tree data structure may be used to store data related to a value associated with a leaf node. In some embodiments, a leaf node, such as leaf node 222, 224, 226, 228, 230, may include a pointer to a tree data structure, such as the tree data structure depicted in FIG. 2E.

In the example shown, leaf node 260 includes a data root node 270 and data leaf nodes 272, 274, 276, 278, and 280. A leaf node may include one or more intermediate nodes, similar to the tree data structure depicted in FIG. 2A. Data root node 270 includes a NodeID and a TreeID. Data root node 270 also includes a set of node keys. Data root node 270 includes a first node key of "1," a second node key of "2," a third node key of "3," and a fourth node key of "4." The data key k for data leaf node 272 is a value that is less than or equal to the first node key. Data leaf node 272 includes a data block 282 that stores bits of ones and zeros. Although data block 282 is depicted as storing the bit pattern "1001," a data block may store any bit pattern. Data leaf node 272 may include a pointer to a physical location that stores the data.

The data key k for data leaf node 274 is a value that is greater than the first node key and less than or equal to the second node key. Data leaf node 274 includes a data block 284 that stores bits of ones and zeros. Although data block 284 is depicted as storing the bit pattern "1011," a data block may store any bit pattern. Data leaf node 274 may include a pointer to a physical location that stores the data.

The data key k for data leaf node 276 is a value that is greater than the second node key and less than or equal to the third node key. Data leaf node 276 includes a data block 286 that stores bits of ones and zeros. Although data block 286 is depicted as storing the bit pattern "0011," a data block may store any bit pattern. Data leaf node 276 may include a pointer to a physical location that stores the data.

The data key k for data leaf node 278 is a value that is greater than the third node key and less than or equal to the fourth node key. Data leaf node 278 includes a data block 288 that stores bits of ones and zeros. Although data block 288 is depicted as storing the bit pattern "1010," a data block may store any bit pattern. Data leaf node 278 may include a pointer to a physical location that stores the data.

The data key k for data leaf node 280 is a value that is greater than the fourth node key. Data leaf node 280 includes a data block 290 that stores bits of ones and zeros. Although data block 290 is depicted as storing the bit pattern "1111," a data block may store any bit pattern. Data leaf node 280 may include a pointer to a physical location that stores the data.

Figure 3A:
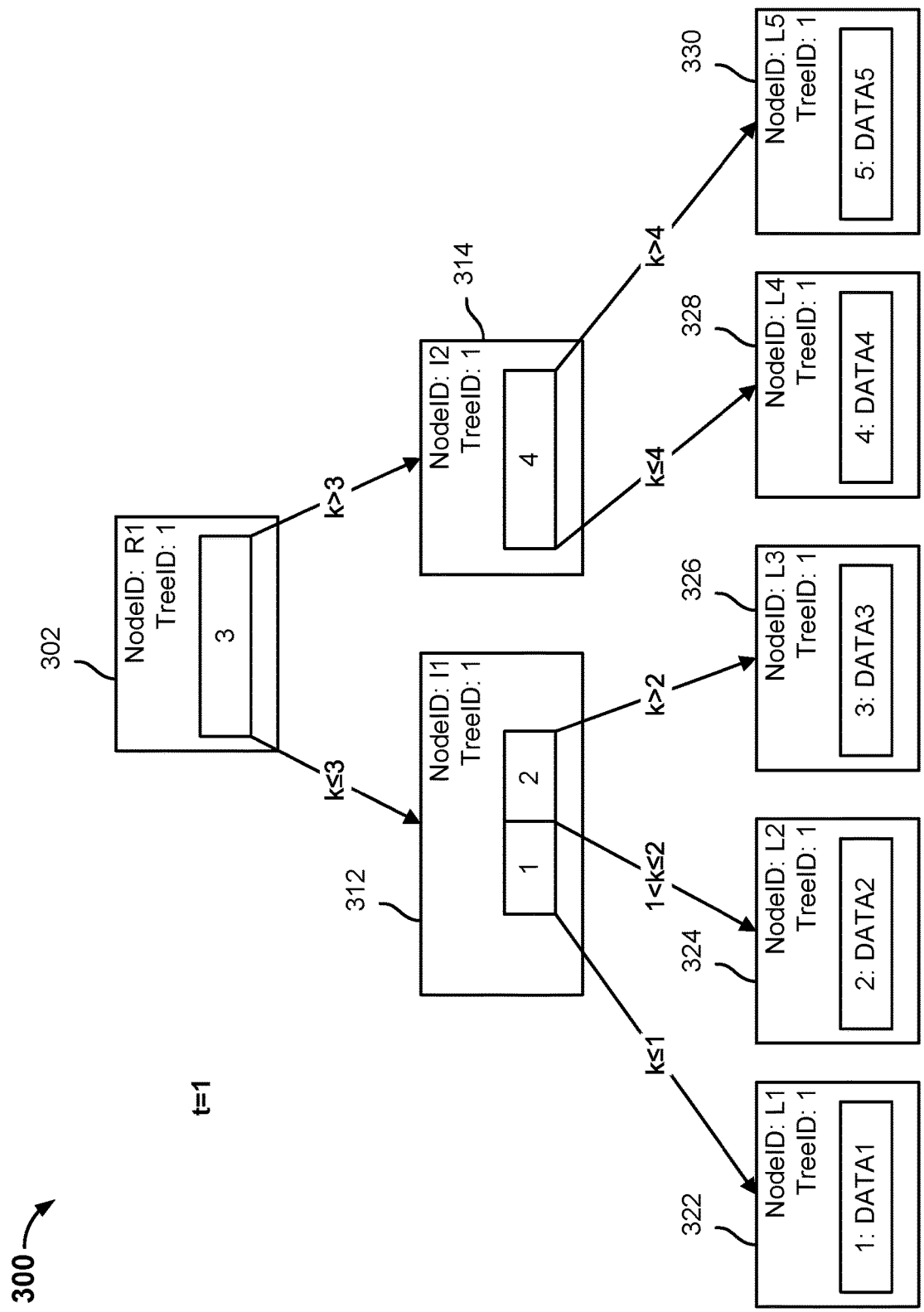
FIG. 3A is a block diagram illustrating an embodiment of a snapshot tree at a particular moment in time.

FIG. 3A is a block diagram illustrating an embodiment of a tree data structure at a particular moment in time. In the example shown, tree data structure 300 is a snapshot tree at time t=1. At t=1, tree data structure 300 includes a root node 302, intermediate nodes 312, 314, and leaf nodes 322, 324, 326, 328, 330. At t=1, tree data structure 300 is similar to the tree data structure 200 shown in FIG. 2A. Tree data structure 300 may correspond to a version of a snapshot tree.

A full snapshot or an incremental snapshot of the snapshot tree at time t=1 may be performed and stored on the storage system. The full snapshot may provide a complete view of the tree data structure at a particular point in time, that is, the full snapshot stores all of the nodes associated with a snapshot at the particular moment in time. For example, a full snapshot at time t=1 would include root node 302, intermediate nodes 312, 314, leaf nodes 322, 324, 326, 328, and 330. An incremental snapshot may provide a partial view of the tree data structure at a particular time. However, in this instance, an incremental snapshot at time t=1 would also include root node 302, intermediate nodes 312, 314, leaf nodes 322, 324, 326, 328, and 330 because those nodes have not been previously stored.

Figure 3B:
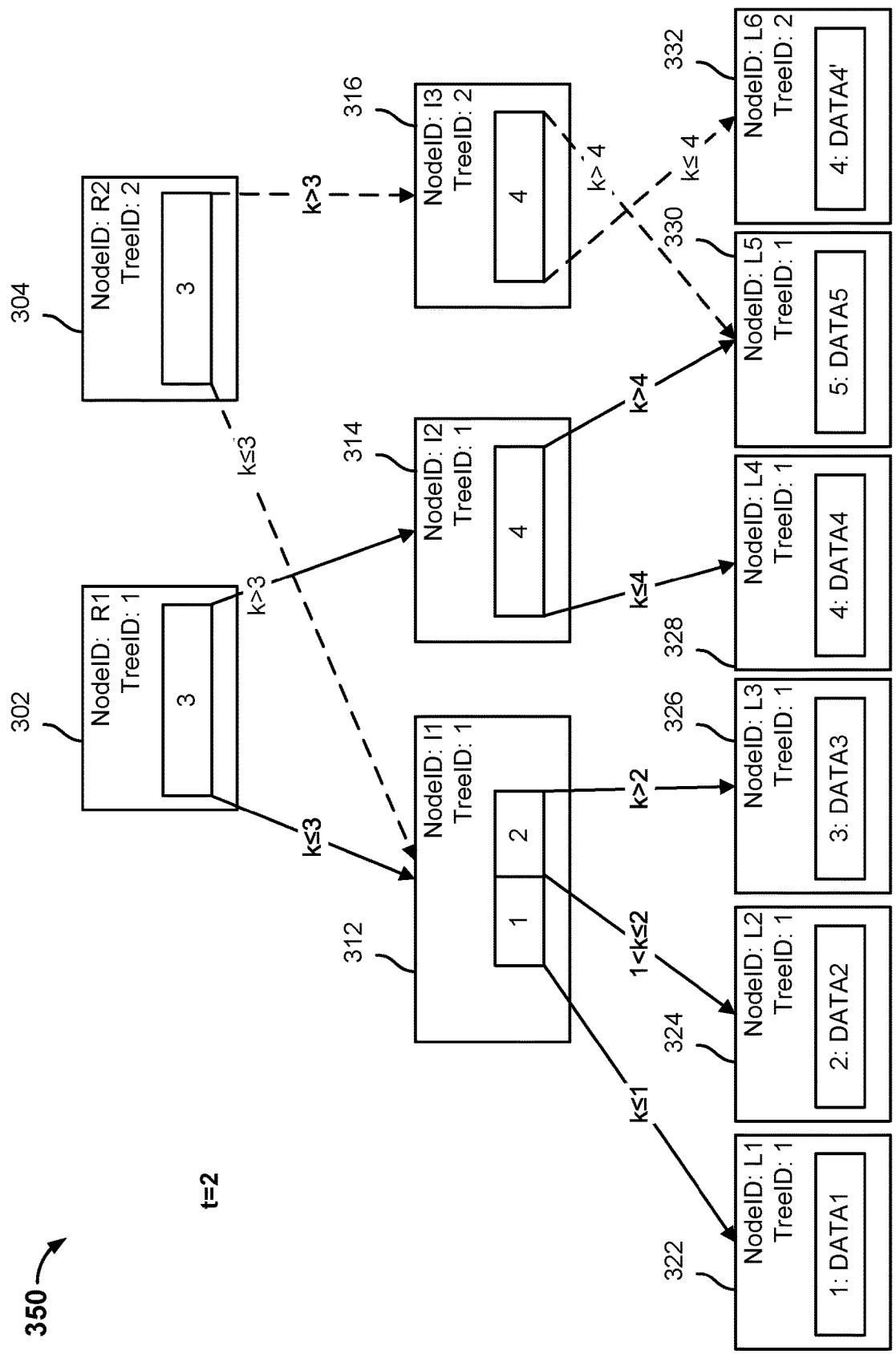
FIG. 3B is a block diagram illustrating an embodiment of a snapshot tree at a particular moment in time.

FIG. 3B is a block diagram illustrating an embodiment of a tree data structure at a particular moment in time. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at time t=2 is linked to the snapshot tree at time t=1. At t=2, the snapshot tree includes root node 304, intermediate nodes 312, 316, and leaf nodes 322, 324, 326, 330, 332. Root node 302 is associated with a snapshot at time t=1 and root node 304 is associated with a snapshot at time t=2. At t=2, the tree data structure 350 is similar to the tree data structure 255 shown in FIG. 2D. The snapshot tree at time t=2 is a modified version of snapshot tree at time t=1 (i.e., the value of "DATA4" has been modified to be "DATA4'"). The snapshot at t=2 may correspond to a version of a snapshot tree.

A full snapshot or an incremental snapshot of the snapshot tree at t=2 may be performed and stored on the storage system. The full snapshot may provide a complete view of the tree data structure at a particular point in time, that is, the full snapshot stores all of the nodes associated with a snapshot tree at the particular moment in time. For example, a full snapshot at time t=2 would include root node 304, intermediate nodes 312, 316, leaf nodes 322, 324, 326, 330, 332, but would not include root node 302, intermediate node 314, and leaf node 328 because those nodes are not associated with the snapshot at time t=2, i.e., a node of a snapshot at time t=2 does not include a pointer to any of those nodes. An incremental snapshot may provide a partial view of the tree data structure at a particular time. The incremental snapshot may store each of the nodes associated with the snapshot tree at the particular moment in time that have not been previously stored. For example, an incremental snapshot at time t=2 would include root node 304, intermediate node 316, and leaf node 332, but in contrast to the full snapshot at t=1, would not include intermediate node 312 and leaf nodes 322, 324, 326, and 330 because those nodes were previously stored at time t=1.

Figure 3C:
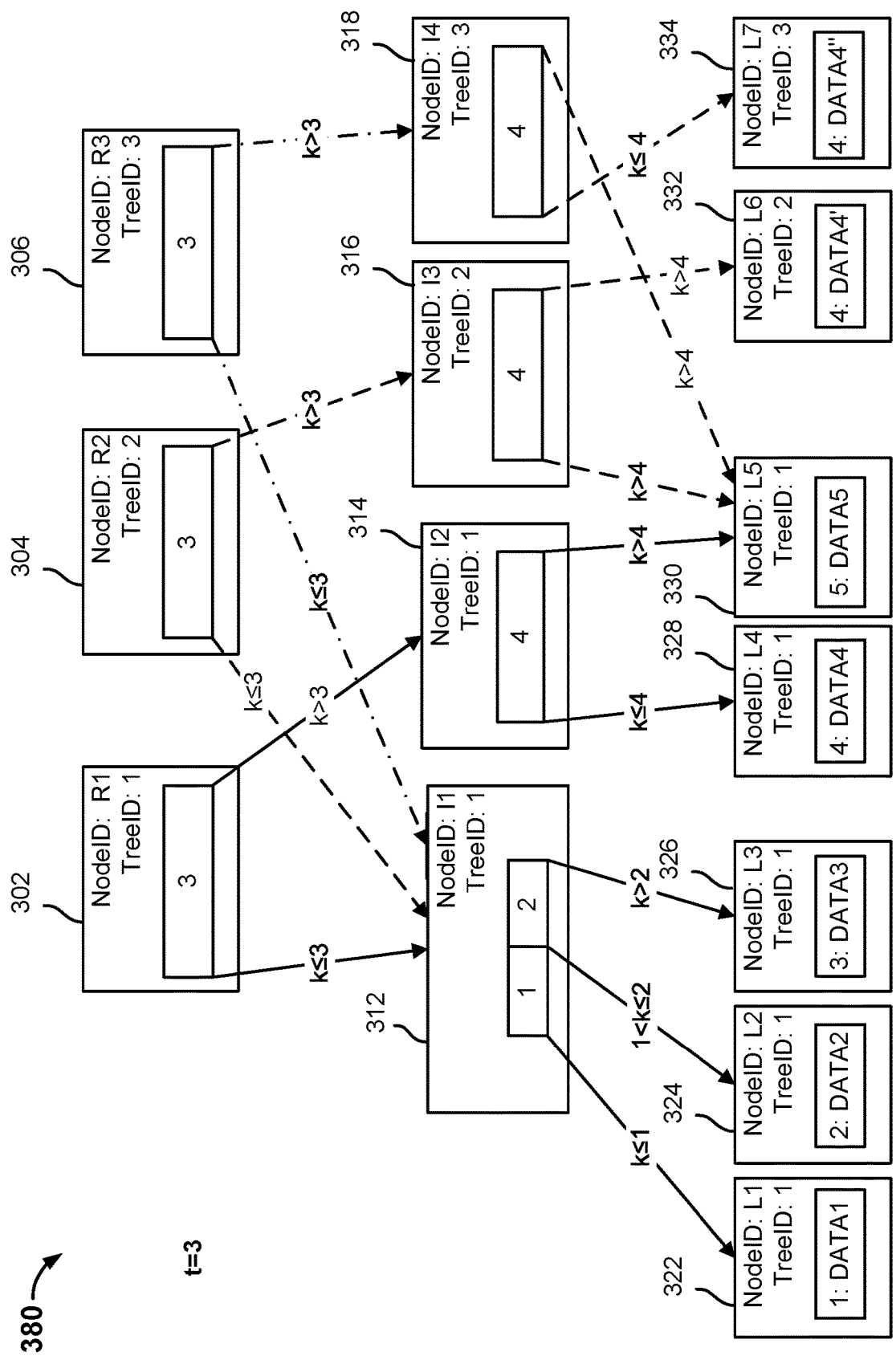
FIG. 3C is a block diagram illustrating an embodiment of a snapshot tree at a particular moment in time.

FIG. 3C is a block diagram illustrating an embodiment of a tree data structure at a particular moment in time. In the example shown, tree data structure 380 includes a snapshot tree at time t=3. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at t=3 is linked to the snapshot trees at t=1, 2. At t=3, the snapshot tree includes root nodes 306, intermediate nodes 312, 318, and leaf nodes 322, 324, 326, 330, 334. Root node 302 is associated with a snapshot at time t=1, root node 304 is associated with a snapshot at time t=2, and root node 306 is associated with a snapshot at time t=3. Snapshot tree 380 is a modified version of the snapshot at t=2 (i.e., the value of "DATA4'" has been modified to be "DATA4''"). The snapshot tree at t=3 may correspond to a version of a snapshot tree.

A full snapshot or an incremental snapshot of the snapshot tree at t=3 may be performed and stored on the storage system. The full snapshot may provide a complete view of the tree data structure at a particular point in time, that is, the full snapshot stores all of the nodes associated with a snapshot at the particular moment in time. For example, a full snapshot at time t=3 would include root node 306, intermediate nodes 312, 318, leaf nodes 322, 324, 326, 330, 334, but would not include root nodes 302, 304, intermediate nodes 314, 316 and leaf nodes 328, 332 because those nodes are not associated with the snapshot at time t=3, i.e., a node of a snapshot at time t=3 does not include a pointer to any of those nodes. An incremental snapshot may provide a partial view of the tree data structure at a particular time. The incremental snapshot may store each of the nodes associated with the snapshot tree at the particular moment in time that have not been previously stored. For example, an incremental snapshot at time t=3 would include root node 306, intermediate node 318, and leaf node 334, but in contrast to the full snapshot at t=3, would not include intermediate node 312 and leaf nodes 322, 324, 326, and 330 because those nodes were previously stored at time t=1.

Figure 3D:
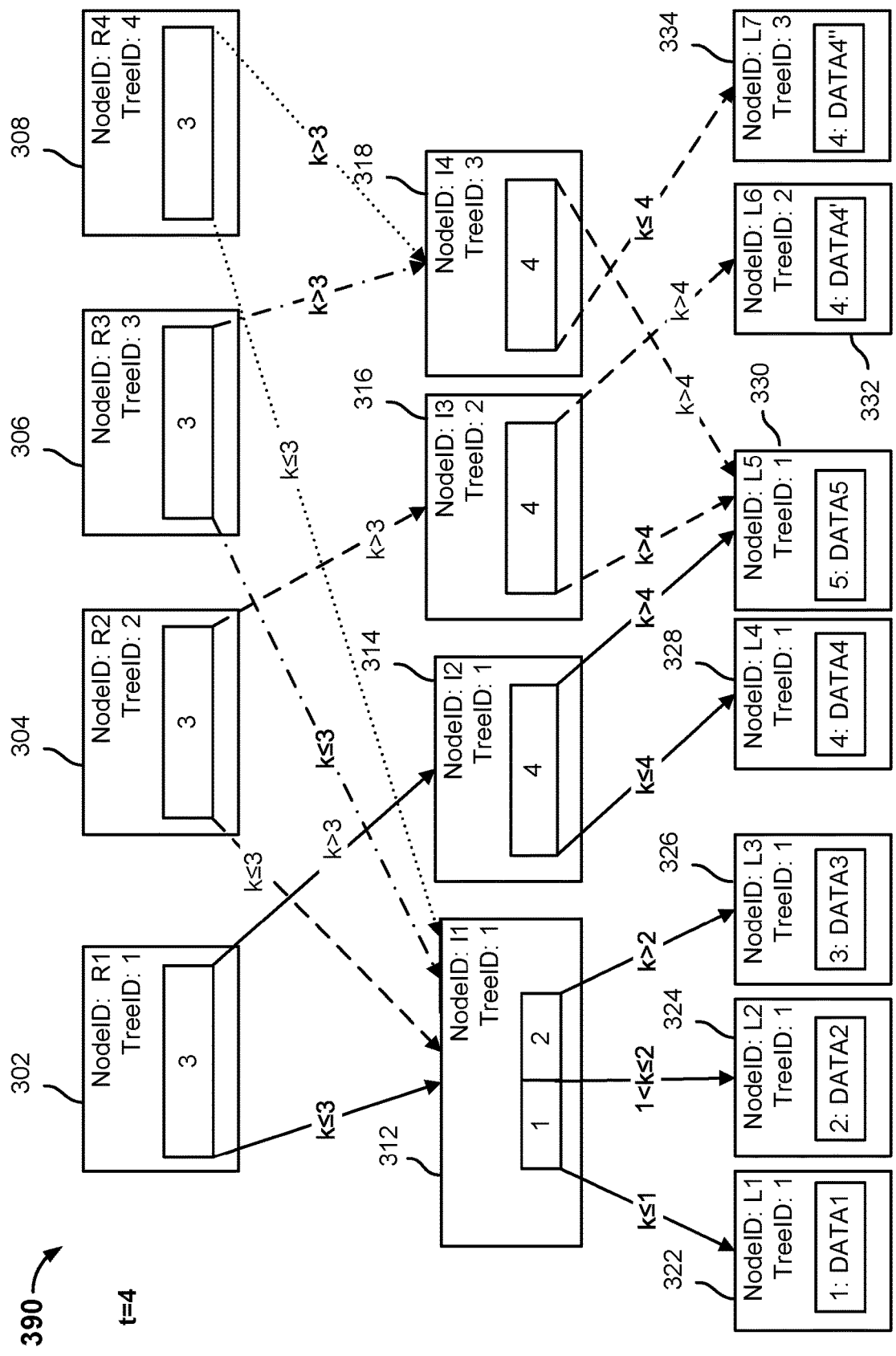
FIG. 3D is a block diagram illustrating an embodiment of a snapshot tree at a particular moment in time.

FIG. 3D is a block diagram illustrating an embodiment of a tree data structure at a particular moment in time. In the example shown, tree data structure 390 includes a snapshot tree at time t=4. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at time t=4 is linked to the snapshot trees at times t=1, 2, 3. At t=4, the snapshot tree includes root node 308, intermediate nodes 312, 318, and leaf nodes 322, 324, 326, 330, 334. Root node 302 is associated with a snapshot at time t=1, root node 304 is associated with a snapshot at time t=2, root node 306 is associated with a snapshot at time t=3, and root node 308 is associated with a snapshot at time t=4. The snapshot tree at time t=4 may correspond to a version of a snapshot tree.

A full snapshot or an incremental snapshot of the snapshot tree at time t=4 may be performed and stored on the storage system. The full snapshot may provide a complete view of the tree data structure at a particular point in time, that is, the full snapshot stores all of the nodes associated with a snapshot at the particular moment in time. For example, a full snapshot at time t=4 would include root node 308, intermediate nodes 312, 318, leaf nodes 322, 324, 326, 330, 334, but would not include root nodes 302, 304, 306 intermediate nodes 314, 316 and leaf nodes 328, 332 because those nodes are not associated with the snapshot at time t=4, i.e., a node of a snapshot at time t=4 does not include a pointer to any of those nodes. An incremental snapshot may provide a partial view of the tree data structure at a particular time. The incremental snapshot may store each of the nodes associated with the snapshot tree at a particular moment in time that has not been previously stored. For example, an incremental snapshot at time t=4 would include root node 308, but in contrast to the full snapshot at t=4, would not include intermediate nodes 312, 318 and leaf nodes 322, 324, 326, 330, 334 because those nodes were previously stored at time t=1 or t=3.

As seen in FIGS. 3B-3D, each snapshot tree builds off of a previous snapshot tree, that is, a chain of snapshot trees exists. Each snapshot tree is associated with a snapshot of the file system data. As more and more snapshots are created and linked, this may require a lot of storage to store the snapshots. To reduce the amount of storage needed to store the snapshots, a policy may indicate that after a full snapshot is performed at a particular point in time, one or more previous snapshots may be deleted from the storage system. In some embodiments, the one or more previous snapshots are deleted after a condition of a retention time policy has passed.

Referring back to FIG. 1, also depicted is additional device 140. Although one additional device 140 is shown, multiple additional devices may be present. Device 140 may be a NAS device and/or another device capable of hosting a VM. If device 140 is a NAS device, then the APIs, logical organization of the data, access controls and responses for device 140 may be different from those of NAS device 105 even if devices 140 and 105 use the same communication protocol. For example, NAS device 105 may be an Isilon device, while device 140 may be a NetApp device. Similarly, if device 140 hosts VMs, then the VMs hosted by device 140 have a different format from VM 106. Device 140 may be connected to secondary storage system 104 via a network which may be the same as or different from network 103. Although not shown as directly connected with primary storage system 102, in some embodiments, device 140 is coupled with primary storage system. In some such embodiments, device 140 is coupled with secondary storage system 104 through primary storage system 102. Further, although shown as separate from primary storage system, in other embodiments, device 140 is part of primary storage system 102.

Secondary storage system 104 may efficiently and reliably replicate data for primary storage system 102. In addition, storage system 100 allows migration of backed up data into multiple formats, such as multiple NAS formats and/or multiple VM formats. More specifically, data from NAS device 105 in the format of the NAS device 105 can be backed up on secondary storage system 104. In so doing, processing and storage of the backup is split between the multiple storage nodes 110 through 120 of secondary storage system 104 and carried out in parallel. As part of processing, data backed up form NAS device 105 is translated to a format of secondary storage system 104. Upon request, data backed up from NAS device 105 can be migrated to device 140 if device 140 is a NAS device. However, device 140 need not have the same format or be of the same NAS device type as NAS device 105. For example, NAS device 105 may be an Isilon device, while device 140 is a NetApp device, or vice versa. The migrate may also be carried out if NAS device 105 has the same device type as device 140. The translation between NAS device types is possible because secondary storage system 104 has detailed information regarding the APIs, behavior and protocols of each NAS device type. Thus, system 100 can receive data from NAS device 105 in the format used by NAS device 105 and convert the received data to the format of secondary storage system 104. Similarly, secondary storage system 104 can take data in the format of secondary storage system 104 and migrate it to device 140. This may be accomplished by converting, at the secondary storage system 104, the data from the format of the secondary storage system 104 to the format of the device 140 and sending the converted data to device 140. In an example, this may be accomplished through the secondary storage system's 104 use of APIs of the device 140, which can enable the secondary storage system 104 to send data to the device 140 where it can be ingested. As a result, flexibility and ease of use of storage system 100 is improved. Further, this migration is carried out in parallel in a manner analogous to processing for backup. Consequently, a single device/node need not be relied upon to complete the conversion to the format of device 140. Thus, efficiency and reliability of the conversion to a new NAS format can be improved. Similarly, system 100 can back up VM 106 and file(s) 107 on secondary storage system 104. In response to a request, VM 106 and file(s) 107 (separately or part of VM 106) can be migrated to device 140 regardless of whether device 140 supports the VM format of VM 106. Again, efficiency and reliability of system 100 is improved.

Figure 4:
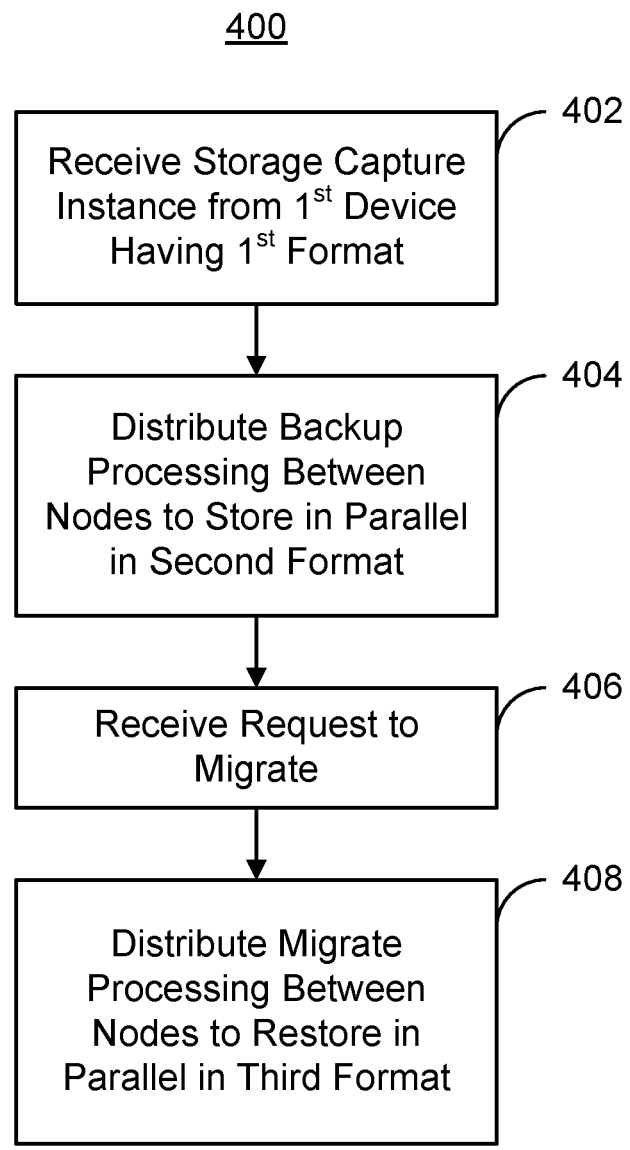
FIG. 4 is a flow chart depicting an embodiment of a method for performing multi-format migrations.

FIG. 4 is a flow chart depicting an embodiment of method 400 for performing multi-format migrations. Method 400 is described in the context of system 100. However, nothing prevents method 400 from use with other systems. Portions of method 400 may be performed in a different order than shown and may include sub-processes. Additional and/or other processes not inconsistent with the method and system described herein may also be performed. In some embodiments, method 400 is performed using processor(s) executing instruction(s) stored in memory or another non-transitory computer-readable medium.

A storage capture instance in a first format from a first type of device is received by secondary storage system 104, at 402. The storage capture instance is in the native format of the device as it exists in primary storage system 102. If the storage capture instance is a snapshot of data stored/backed up on NAS device 105 taken by NAS device 105, then the storage capture instance is in the particular NAS format for NAS device 105. For example, if the storage capture instance is a snapshot of data previously archived on NAS device 105 and NAS device 105 is a NetApp device, then the storage capture instance (the snapshot) is in NetApp format. If the storage capture instance is VM 106 or file(s) 107 within VM 106, then the storage capture instance shares the VM format of VM 106. For example, if VM 106 is a VMware VM, then the storage capture instance has the VMware format.

Backup processing is distributed across some or all of storage nodes 110 through 120, at 404. The backup processing is used to back up the storage capture instance to the format of secondary storage system 104. More specifically, the storage capture instance is converted and stored, including creation of a snapshot tree described above. Secondary storage system 104 includes information regarding the formats and behaviors of the devices having multiple types and for which data are being stored. For example, secondary storage system 104 has detailed information regarding the protocols, APIs, responses to NAS protocols, access controls, data structures such as volumes or trees, in NAS device 105 if the storage capture instance is a snapshot of the files store on NAS device 105. Similarly, secondary storage system 104 has detailed information regarding the format of VM 106 and is capable of reviewing and indexing the contents of VM 106. Such an index includes a list of the contents, such as files, within VM 106. Secondary storage system 104 can thus be hyperconverged storage capable of functioning with various formats for different vendors within a single platform, and converting the various formats to the format of secondary storage system. Further, backup processing at 404 is performed by multiple storage nodes 110 through 120. The number of storage nodes 110 through 120 used at 404 depends upon the availability of storage nodes 110 through 120, for example based on available storage capacity of the node, availability due to failures or restarts and/or whether the node has sufficient processing bandwidth available. At 404, therefore, the storage capture instance from primary storage system 102/NAS device 105 is converted to the format of secondary storage system 104 and stored in a distributed manner using multiple storage nodes 110 through 120.

A request to migrate at least a portion of the storage capture instance to a second type of device 140 in a third format is received at 406. In some embodiments, 406 occurs at some time after 402 and 404. Thus, 406 can be a simple migrate request based on items already present in secondary storage system 104. In other embodiments, 406 may be a migrate request for items in primary storage system 102 or NAS device 105. For such a migrate request, the items desired to be migrated to new device 140 may or may not already be present in secondary storage system 104. In such embodiments, the items desired to be migrated to new device 140 that are not already present in secondary storage system 104 are acquired by performing steps 402 and 404 before migrate processing is distributed as described below.

In response to the request, migrate processing is distributed to some or all of storage nodes 110 through 120, at 408. Migrate processing is utilized to migrate the desired portion of the storage capture instance from the second format of secondary storage system 104 to the device 140 having a third format. Thus, the storage capture instance is converted from the format of secondary storage system 104, such as the snapshot tree, to the format of device 140. As discussed above, secondary storage system 104 includes information regarding the formats and behaviors of the devices having multiple types and for which data are being stored. Secondary storage system also has such information about the formats and devices to which data are to be migrated. For example, secondary storage system 104 has detailed knowledge regarding the protocols, APIs, responses to NAS protocols, access controls, data structures such as volumes or trees, not only in NAS device 105 but also in device 140 if device 140 is a NAS device. Similarly, secondary storage system 104 has detailed information regarding not only VM 106, but also the format for VMs that can reside on device 140. Further migrate processing at 408 is performed by multiple storage nodes 110 through 120. The number of storage nodes 110 through 120 used at 408 depends upon the availability of storage nodes 110 through 120, for example based on available storage capacity of the storage node, availability due to failures or restarts and/or whether the storage node has sufficient processing bandwidth available. At 408, therefore, the storage capture instance from primary storage system 102/NAS device 105 that is in the secondary storage system format is converted to the format of device 140. The migrated item(s) can be provided to device 140 in the appropriate format.

Using method 400 data from primary storage system 102 and/or NAS device 105 can be backed up and migrated to multiple formats. More specifically, data from NAS device 105 in the format of the NAS device 105 can be backed up on secondary storage system 104 and migrated to device 140 if device 140 is a NAS device regardless of whether device 140 has the same or a different format. Similarly, method 400 can back up VM 106 and file(s) 107 on secondary storage system 104 and migrate them to device 140 regardless of whether device 140 supports the VM format of VM 106. This capability might be part of the regular backup process for secondary storage system 104 in combination with a migrate command that migrates data from secondary storage system 104 to device 140, and/or may be for a command that migrates data residing on device 105 to device 140. As a result, flexibility and ease of use of storage system 100 is improved. Further, processing is carried out in parallel for both backup and migration. Consequently, a single device/node need not be relied upon to complete the conversion to the format of device 140. Thus, method 400 enhances the efficiency of storage system.

Figure 5:
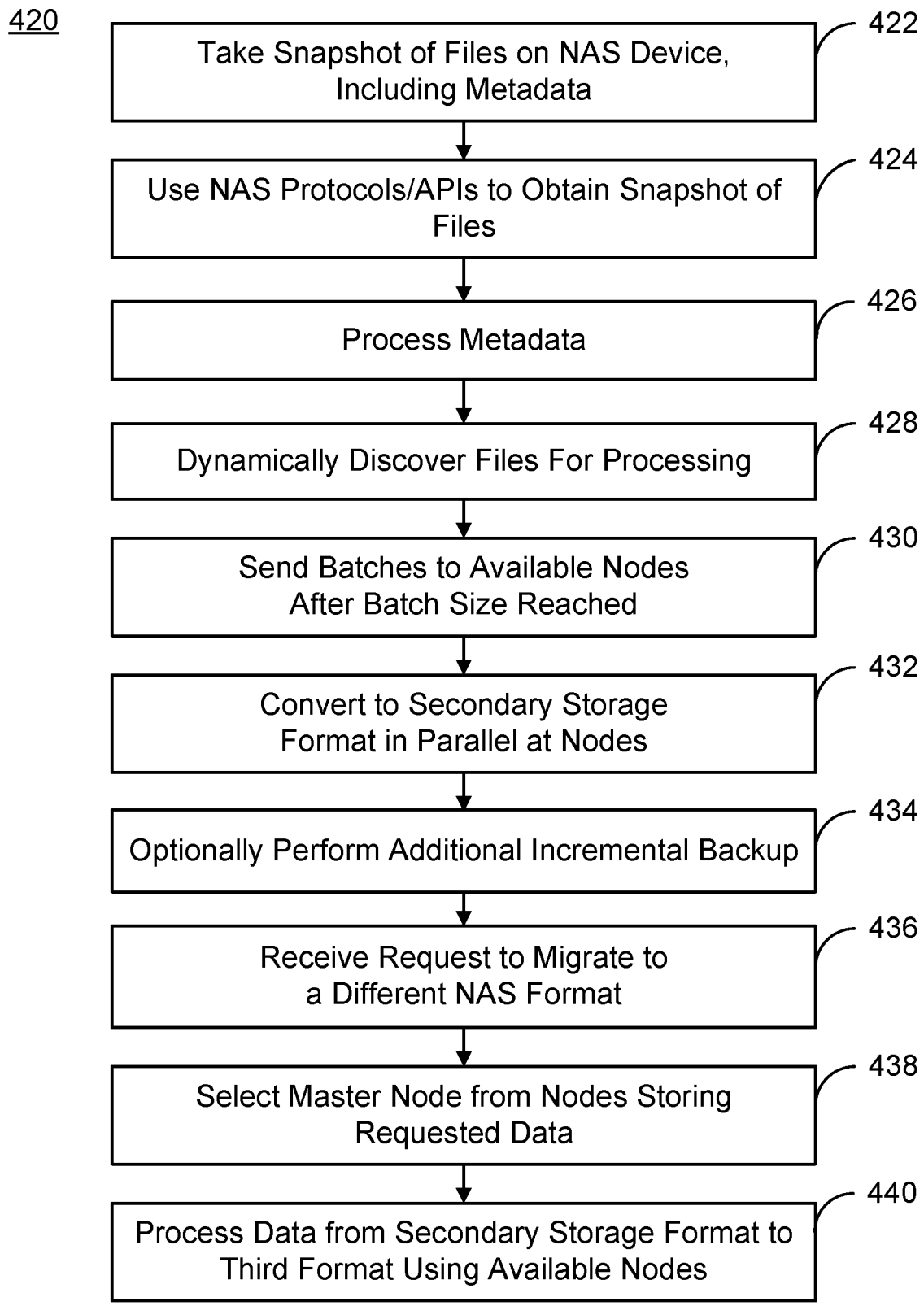
FIG. 5 is a flow chart depicting an embodiment of a method for performing multi-format migrations for a network attached storage device.

FIG. 5 is a flow chart depicting an embodiment of method 420 for performing multi-format migrations for NAS devices. Method 420 is described in the context of system 100 and NAS device 105. However, nothing prevents method 420 from use with other systems and other NAS devices. Further, although only one NAS device 105 is discussed, method 420 is usable for multiple NAS devices used with primary storage system 102 and which may or may not have the same format. Portions of method 420 may be performed in a different order than shown and may include sub-processes. Additional and/or other processes not inconsistent with the method and system described herein may also be performed. In some embodiments, method 420 is performed using processor(s) executing instruction(s) stored in memory or another non-transitory computer-readable medium. In some embodiments, method 420 may be carried out in response to a migrate command. In other embodiments, method 420 may be part of a larger backup operation.

A NAS snapshot of the file system for NAS device 105 is captured, at 422. The NAS snapshot capture at 422 is carried out by NAS device 105 and may be executed using utilities on NAS device 105. Thus, the NAS snapshot is in the NAS format of NAS device 105. This NAS snapshot is the storage capture instance described above with respect to method 400. The snapshot provides static view of the data for NAS device 105. Use of a stable version of the files of NAS device 105 allows the backup of NAS device 105 by secondary storage system 104 without changes being made to files being copied, files being missing or other issues that arise because of the use of files on NAS device 105 during backup.

The NAS snapshot is received at secondary storage system 104 from NAS device 105 at 424. The NAS snapshot is still in the format of NAS device 105. This may be accomplished by requesting the NAS snapshot via APIs or another mechanism consistent with the format of NAS device 105. The NAS snapshot received at 424 is a chunk of data that may not immediately expose its internal organization. Secondary storage system 104 ingests the received NAS snapshot.

Metadata for the files in the NAS snapshot is processed by secondary storage system 104, at 426. The metadata is translated to the format of secondary storage system 104 at 426. In some embodiments, this translation occurs at the master node. In alternate embodiments, the translation carried out in another manner. Because secondary storage system 104 uses NAS protocols, such as SMB or NFS, to communicate with NAS device 105, translation of the metadata may be readily completed. In some embodiments, metadata are processed at a master node. Thus, 426 may include selection of a master node from storage nodes 110 through 120. The master node performs management and tracking functions for processing data in the NAS snapshot, including distributing work to storage nodes and tracking progress of the storage nodes. The master node dynamically distributes processing and storage of the snapshot between some or all of the storage nodes of secondary storage system 104. Dynamic distribution of processing and storage across the storage nodes is accomplished via 428 and 430. Using the metadata translated at 426, the files in the NAS snapshot are dynamically discovered, at 428. For example, a tree structure in the NAS snapshot may be traversed to discover the files one-by-one. Once a sufficient number of files have been discovered to process together in a batch of a desired size, the batches are sent to one of the available storage nodes, at 430. The desired size of the batch is adjusted based upon the resources available in the primary storage system and secondary storage system. Steps 428 and 430 are performed together such that a batch is sent to a storage node when both a storage node is available to process the data and a sufficient amount of data is accessible. Steps 428 and 430 are thus repeated until all of the files in the NAS snapshot have been discovered and sent by master node to available nodes of storage nodes 110 through 120. Although batches are sent to multiple storage nodes, all of the storage nodes in secondary storage system 104 need not be used to process files in the NAS snapshot. Thus, the available nodes simply include those storage nodes of storage nodes 110 through 120 that that are used to process the NAS snapshot. In some embodiments, the master node may process the NAS snapshot in addition to performing the functions described above. In other embodiments, the master node may not be made available to process data. In such embodiments, the available nodes do not include the master node.

The available storage nodes of 110 through 120 process the files from the NAS snapshot in parallel, at 432. Consequently, the files in the NAS snapshot are converted to the format of secondary storage system 104. In some embodiments, conversion of the NAS snapshot includes not only storing data tor the NAS snapshot in cluster 108, but also formation of a snapshot tree (e.g. the Cohesity snaptree) described above. In addition to dynamic distribution, the master node manages parallel processing at 432. For example, the master node keeps a record of all files that each node is processing and is updated by the nodes on progress in completing processing. Thus, master node can perform bookkeeping functions and stores this information in distributed persistent storage. In addition, if one of the nodes processing the data fails and restarts, the master node has the information related to processing. Consequently, the restarted node can recommence processing from where processing was terminated. In addition, method 420 and system 104 are resilient against failures of the master node. System 104 can select a new master node in the event of failure of the master node and continue bookkeeping functions using the information in persistent storage. Consequently, parallel processing of the NAS snapshot at 432 may be reliably and efficiently performed.

Because method 420 uses a NAS snapshot, changes may have occurred to the primary files residing on NAS device 105 between capture of the snapshot and completion of processing the NAS snapshot. Consequently, an incremental backup is optionally performed at 434. In some embodiments, at 434 a request for a NAS snapshot may again be sent such that NAS device 105 returns metadata indicating the changes to files on NAS device 105 and the associated file changes. Also at 434, the changes are processed and stored in an analogous manner to steps 426 through 432. Thus, an updated version of the files on NAS device is obtained. Alternatively, NAS device 105 may simply be backed up again when primary storage system undergoes another backup such as an incremental backup.

A request to migrate at least a portion of the data from the NAS snapshot instance to a second type of device 140 in a different NAS format is received at 436. In some embodiments, 436 can be a simple request to migrate on items already present in secondary storage system 104 to device 105. In other embodiments, 436 may be a request to migrate items on NAS device 105 to device 105. For such a migrate request, the items desired to be migrated to new device 140 may or may not already be present in secondary storage system 104. In such embodiments, 436 may occur before 422.

In response to the request, a master node is selected at 438. In some embodiments, the master node chosen at 438 is the same as the master node used for storing the NAS snapshot.

Migrate processing is distributed to the available storage nodes 110 through 120, at 440. Migrate processing is analogous to backup processing performed at 432. However, at 440, data is converted from the format of secondary storage system 104 to the NAS format of device 140. The master node performs analogous functions at 440 as at 432. Thus, the master node performs bookkeeping functions. If one of the available nodes fails and restarts, the migration can recommence the migration from the desired location in an analogous manner to that described for backup. If the master node fails, then another of storage nodes 110 through 120 may be selected as the master node and processing can continue. Method 420 and system 104 are thus resilient against failures of the master node during the migration. Consequently, parallel processing of the snapshot tree for migration at 440 may be reliably and efficiently performed.

Using method 420 data from NAS device 105 can be backed up and migrated to a new NAS format(s) on other NAS devices such as device 140. In some embodiments, the backup and migration can be provided via a single migrate request. As a result, flexibility and ease of use of storage system 100 is improved. Further, backup and migration are each carried out in parallel across multiple storage nodes. Consequently, a single device/node need not be relied upon to complete the conversion from the format of NAS device 105 to the format of NAS device 140. Because a master node is used, the parallel processing by the nodes can be effectively managed. Secondary storage system 102 can also select a new master node in the event of failure of the master node. Thus, secondary storage system can recover from failures of the master or other nodes. Thus, method 420 thus provides improved flexibility, efficiency and reliability in migrations.

Figure 6:
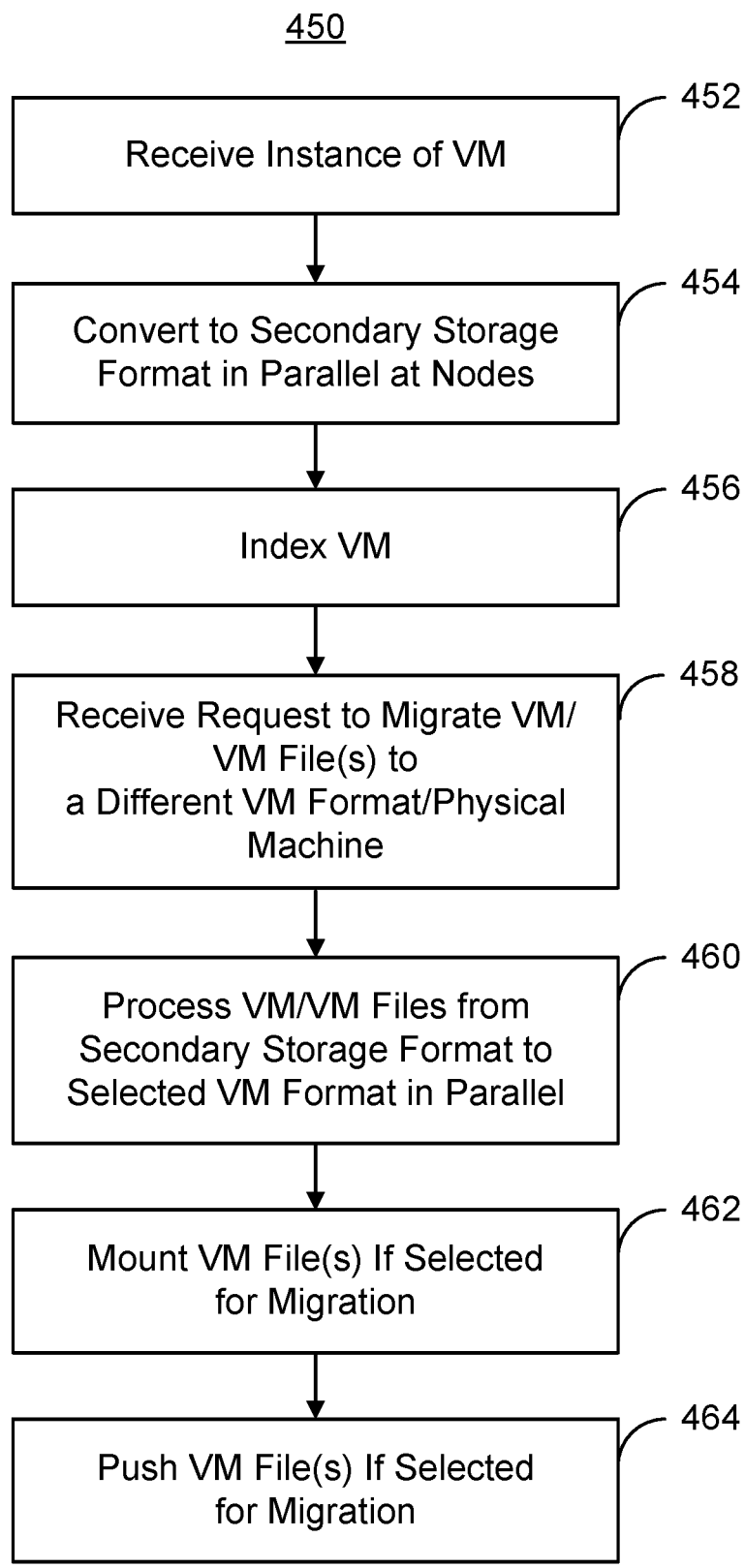
FIG. 6 is a flow chart depicting an embodiment of a method for performing multi-format migrations for a virtual machine or virtual machine contents.

FIG. 6 is a flow chart depicting an embodiment of method 450 for performing multi-format migrations for VMs and/or file(s) within VMs. Method 450 is described in the context of system 100 and VM 106. However, nothing prevents method 450 from use with other systems and other VMs. Further, although only one VM 106 is discussed, method 450 is usable for multiple VMs used with primary storage system 102 and which may or may not have the same format. Portions of method 450 may be performed in a different order than shown and may include sub-processes. Additional and/or other processes not inconsistent with the method and system described herein may also be performed. In some embodiments, method 450 is performed using processor(s) executing instruction(s) stored in memory or another non-transitory computer-readable medium. In some embodiments, method 450 may be carried out in response to a migrate command. In other embodiments, method 450 may be part of a larger backup operation.

An instance of VM 106 is received at secondary storage system 104 from primary storage system 102 at 452. The VM 106 is still in its original format. VM 106 is processed, in parallel by some or all of storage nodes 110 through 120, at 454. In some embodiments, a master node may be used in a manner analogous to that described above. Thus, VM 106 is converted to the format of secondary storage system 104 and stored. In some embodiments, VM 106 is converted to a portion of a snapshot tree (e.g. the Cohesity snaptree) described above. As part of processing at 454 or after being stored in storage nodes 110 through 120, VM 106 is indexed at 456. Stated differently, the file system, including file(s) 107, is indexed such that the data within the file(s) 107 and how file(s) 107 are arranged within VM 106 are known by secondary storage system 104. In some embodiments, indexing of file(s) 107 is performed only in response to a request to migrate file(s) 107 to another VM format. In other embodiments, indexing of file(s) 107 is performed as part of a backup process such that the requisite information is ready in the event of a migrate request. As a result, the file(s) 107 within the VM are known by secondary storage system 102 at backup.

A request to migrate VM 106 or one or more file(s) 107 in VM 106 is received by secondary storage system 104, at 458. Suppose VM 106 is desired to be migrated to device 140 that utilizes a different VM format than that used in VM 106 residing in primary storage system. Thus, conversion to a new VM format is required. In some embodiments, the physical device to which VM 106 is desired to be migrated may be of a different type than the device on which VM 106 resided in primary storage system 102. As indicated above, the request may be to migrate the entire VM 106, or simply one or more selected file(s) 107 within VM 106. In some embodiments, 458 can be a simple migrate request based on items already present in secondary storage system 104. In other embodiments, 458 may be a migrate request for VM 106 on primary storage system 102. For such a migrate request, the VM 106 may or may not already be present in secondary storage system 104. In such embodiments, 458 may occur before 452.

In response to the request, migrate processing is performed by some or all of storage nodes 110 through 120, at 460. Migrate processing is analogous to backup processing performed at 454. However, at 460, VM 106 and/or file(s) 107 are converted from the format of secondary storage system 104 to the VM format of device 140. In some embodiments, parallel processing is performed in an analogous manner to that described above in method 420. Thus, VM 106 and/or file(s) 107 may be migrated to a different format to device 140.

If one or more file(s) 107 within VM 106 were selected to be migrated to a different VM format at 458, then these files are made available, for example by mounting to secondary storage system 104 after being converted to the desired format of device 140, at 462. Mounting at 462 is performed such that file(s) 107 match the VM format of and are usable by VMs in device 140. Because file(s) 107 are presented in the correct format for VMs on device 140 (not shown), the file(s) 107 mounted on secondary storage system 104 can be pushed to device 140, at 464. Consequently, one or more VMs on device 140 may use file(s) 107 from VM 106 residing on primary storage system 102, even though VMs on device 140 and VMs on device 107 natively operate using files of different formats.

Using method 450 from VM 106 and/or file(s) 107 can be backed up and migrated to new VM format(s) and/or on other physical devices. Thus, VM 106 and/or file(s) 107 can be migrated to a device, such as device 140, having a different VM format. In some embodiments, the backup and migrate can be provided via a single migrate request. As a result, flexibility and ease of use of storage system 100 is improved. Further, backup and migration are carried out in parallel across multiple storage nodes. Consequently, a single device/storage node need not be relied upon to complete the conversion from the format of VM 106 to the VM format of device 140. In some embodiments, the parallel processing by storage nodes can be effectively managed, including recovery from failures of the master or other nodes. Thus, method 450 provides improved flexibility, efficiency and reliability in migrations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving a storage capture instance in a first format from a first type of device, wherein the storage capture instance includes a plurality of items for the first type of device and a first metadata item;
    distributing to a plurality of storage nodes, backup processing utilized to back up the storage capture instance to a second format of a snapshot tree, the backup processing including converting from the first format to the second format, the plurality of storage nodes storing the snapshot tree, wherein distributing the backup processing to the plurality of storage nodes comprises:
        ingesting the first metadata item to provide a second metadata item in the second format,
        selecting one of the plurality of storage nodes as a master node,
        discovering the plurality of items in a snapshot of a file system,
        dividing the plurality of items into a plurality of batches of items, and
        distributing the plurality of batches to a portion of the plurality of storage nodes using the master node;
    receiving a request to migrate at least a portion of the storage capture instance to a second type of device in a third format; and
    in response to the request, distributing to the plurality of storage nodes, migrate processing utilized to migrate the at least the portion of the storage capture instance from the second format to the second type of device in the third format.

2. The method of claim 1, wherein the first type of device is a first network attached storage device and the second type of device is a second network attached storage device.

3. The method of claim 2, wherein the storage capture instance is the snapshot of a file system in the first format, the file system including a plurality of files for the first network attached storage device and a first metadata file, and wherein the distributing to the plurality of storage nodes, the backup processing further includes:
    dynamically distributing processing to the plurality of storage nodes.

4. The method of claim 1, wherein the first type of device is a first device utilizing a first virtual machine format, wherein the second type of device is a second device utilizing a second virtual machine format, and wherein the storage capture instance includes at least one virtual machine in the first virtual machine format.

5. The method of claim 4, wherein the at least the portion of the storage capture instance requested to be migrated to the third format consists of a virtual machine of the at least one virtual machine.

6. The method of claim 4, wherein the distributing to the plurality of storage nodes, the backup processing further includes:
    indexing at least one file in the at least one virtual machine.

7. The method of claim 6, wherein the at least the portion of the storage capture instance includes a selected file in a virtual machine of the at least one virtual machine and wherein the migrate processing utilized to migrate the at least the portion of the storage capture instance to the second type of device in the third format further includes:
    mounting the selected file in the second virtual machine format; and
    pushing the selected file to the second device having the second virtual machine format.

8. The method of claim 1 wherein the snapshot tree includes a plurality of nodes and at least one pointer from a root node of the snapshot tree to at least one intermediate node of a previous snapshot tree.

9. A method, comprising:
receiving a storage capture instance in a first format from a first network attached storage device, the storage capture instance being a snapshot of a file system in the first format, the file system including a plurality of files for the first network attached storage device and a first metadata file;
dynamically distributing to a plurality of storage nodes, backup processing utilized to back up the storage capture instance to a second format of a snapshot tree, wherein the dynamically distributing further includes:
ingesting the first metadata file to provide a second metadata file in the second format;
selecting one of the plurality of storage nodes as a master node;
discovering the plurality of files in the snapshot of the file system;
dividing the plurality of files into a plurality of batches of files; and
distributing the plurality of batches to a portion of the plurality of storage nodes using the master node;
receiving a request to migrate at least a portion of the storage capture instance to a second network attached storage device in a third format; and
in response to the request, distributing to the plurality of storage nodes, migrate processing utilized to migrate at least the portion of the storage capture instance from the second format to the second network attached storage device in the third format.

10. The method of claim 9, wherein the at least the portion of the storage capture instance to be migrated includes at least one of the plurality of files and fewer than the plurality of files.

11. A system for migrating data, comprising:
a processor configured to:
receive a storage capture instance in a first format from a first type of device, wherein the storage capture instance includes a plurality of items for the first type of device and a first metadata item;
distribute to a plurality of storage nodes, backup processing utilized to back up the storage capture instance to a second format of a snapshot tree, the backup processing including converting from the first format to the second format, the plurality of storage nodes storing the snapshot tree, wherein to distribute the backup processing to the plurality of storage nodes, the processor is configured to:
ingest the first metadata item to provide a second metadata item in the second format,
select one of the plurality of storage nodes as a master node,
discover the plurality of items in a snapshot of a file system,
divide the plurality of items into a plurality of batches of items, and
distribute the plurality of batches to a portion of the plurality of storage nodes using the master node;
receive a request to migrate at least a portion of the storage capture instance to a second type of device in a third format; and
in response to the request, distributing to the plurality of storage nodes, migration processing utilized to migrate the at least the portion of the storage capture instance from the second format to the second type of device in the third format; and
a memory coupled to the processor and configured to provide the processor with instructions.

12. The system of claim 11, wherein the first type of device is a first network attached storage device and wherein the second type of device is a second network attached storage device.

13. The system of claim 12, wherein the first type of device is a first network attached storage device, the second type of device is a second network attached storage device, and the storage capture instance is the snapshot of a file system in the first format, the file system including a plurality of files for the first network attached storage device and a first metadata file, and wherein to distribute to the plurality of storage nodes the backup processing the processor is further configured to:
dynamically distribute processing to the plurality of storage nodes.

14. The system of claim 11, wherein the first type of device is a first device utilizing a first virtual machine format, wherein the second type of device is a second device utilizing a second virtual machine format and wherein the storage capture instance includes at least one virtual machine in the first virtual machine format.

15. The system of claim 14, wherein the at least the portion of the storage capture instance requested to be migrated to the third format consists of a virtual machine of the at least one virtual machine.

16. The system of claim 14, wherein to distribute to the plurality of storage nodes, the backup processing, the processor is further configured to:
index at least one file in the at least one virtual machine.

17. The system of claim 16, wherein the at least the portion of the storage capture instance includes a selected file in a virtual machine of the at least one virtual machine and wherein to distribute to the plurality of storage nodes the migrate processing, the processor is further configured to:
mount the selected file in the second virtual machine format; and
push the selected file to a second device having the second virtual machine format.

18. The system of claim 11 wherein the snapshot tree includes a plurality of nodes and at least one pointer from a root node of the snapshot tree to at least one intermediate node of a previous snapshot tree.

19. A system for migrating data, comprising:
a processor configured to:
receive a storage capture instance in a first format from a first network attached storage device, the storage capture instance being a snapshot of a file system in the first device format, the file system including a plurality of files for the first network attached storage device and a first metadata file;
dynamically distribute to a plurality of storage nodes, backup processing utilized to back up the storage capture instance to a second format of a snapshot tree, wherein to dynamically distribute backup processing to the plurality of storage nodes, the processor is further configured to:
ingest the first metadata file to provide a second metadata file in the second format;
select one of the plurality of storage nodes as a master node;
discover the plurality of files in the snapshot of the file system;

divide the plurality of files into a plurality of batches of files; and distribute the plurality of batches to a portion of the plurality of storage nodes using the master node;

receive a request to migrate at least a portion of the storage capture instance to a second network attached storage device in a third format; and in response to the request, distributing to the plurality of storage nodes, migration processing utilized to migrate at least the portion of the storage capture instance from the second format to the second network attached storage device in the third format; and a memory coupled to the processor and configured to provide the processor with instructions.

20. The system of claim 19, wherein the at least the portion of the storage capture instance to be migrated includes at least one of the plurality of files and fewer than the plurality of files.

21. A computer program product for migrating data, the computer program product being embodied in a non-transitory computer readable storage medium and comprising computer instructions for:

receiving a storage capture instance in a first format from a first type of device, wherein the storage capture instance includes a plurality of items for the first type of device and a first metadata item;

distributing to a plurality of storage nodes, backup processing utilized to back up the storage capture instance to a second format of a snapshot tree, the backup processing including converting from the first format to the second format, the plurality of storage nodes storing the snapshot tree, wherein distributing the backup processing to the plurality of storage nodes further includes instructions for:

ingesting the first metadata item to provide a second metadata item in the second format, selecting one of the plurality of storage nodes as a master node, discovering the plurality of items in a snapshot of a file system, dividing the plurality of items into a plurality of batches of items, and distributing the plurality of batches to a portion of the plurality of storage nodes using the master node;

receiving a request to migrate at least a portion of the storage capture instance to a second type of device in a third format; and in response to the request, distributing to the plurality of storage nodes, migrate processing utilized to migrate the at least the portion of the storage capture instance from the second format to the second type of device in the third format.

22. The computer-program product of claim 21, wherein the first type of device is a first network attached storage device and wherein the second type of device is a second network attached storage device.

23. The computer-program product of claim 21, wherein the first type of device is a first device utilizing a first virtual machine format, wherein the second type of device is a second device utilizing a second virtual machine format and wherein the storage capture instance includes at least one virtual machine in the first virtual machine format.

24. The computer program product of claim 21 wherein the snapshot tree includes a plurality of nodes and at least one pointer from a root node of the snapshot tree to at least one intermediate node of a previous snapshot tree.

\* \* \* \* \*

UNITED STATES PATENT AND TRADEMARK OFFICE
CERTIFICATE OF CORRECTION

PATENT NO. : 10,620,883 B1
APPLICATION NO. : 16/257689
DATED : April 14, 2020
INVENTOR(S) : Zheng Cai et al.

Page 1 of 1

It is certified that error appears in the above-identified patent and that said Letters Patent is hereby corrected as shown below:

In the Specification

In Column 6, Line 66, delete "TreeD" and insert --TreeID--, therefor.
In Column 7, Line 45, delete ""12"" and insert --"I2"--, therefor.

Signed and Sealed this
Twenty-second Day of September, 2020

Andrei Iancu
*Director of the United States Patent and Trademark Office*